United States Patent [19]

Zimmerman

[11] 4,121,621
[45] Oct. 24, 1978

[54] PILOT OPERATED FLUSHING VALVE

[75] Inventor: Harry M. Zimmerman, La Mesa, Calif.

[73] Assignee: Reed Irrigation Systems, El Cajon, Calif.

[21] Appl. No.: 746,699

[22] Filed: Dec. 2, 1976

[51] Int. Cl.² .............................................. F16K 7/07
[52] U.S. Cl. .................................. 137/863; 251/61.1; 251/5; 251/148; 239/111
[58] Field of Search .................. 251/61.1, 5, 152, 147, 251/151, 148; 239/111; 137/863

[56] References Cited

U.S. PATENT DOCUMENTS

| | | | |
|---|---|---|---|
| 1,064,154 | 6/1913 | Miller | 285/255 |
| 2,000,352 | 5/1935 | Pease | 251/147 |
| 2,823,887 | 2/1958 | Osinski | 251/148 |
| 3,556,465 | 1/1971 | Little | 251/147 X |
| 3,881,686 | 5/1975 | Hirmann | 251/61.1 |

FOREIGN PATENT DOCUMENTS 986,047  3/1949  France .......................................... 251/5

Primary Examiner—Arnold Rosenthal
Attorney, Agent, or Firm—Roger W. Erickson

[57] ABSTRACT

A flushing valve for installation in a drip irrigation system comprises a head portion at one end of a tubular body that fits within the end of one of a series of lateral conduits of the system and has a recess open to the conduit. A transverse passage extends diametrically through the head portion to accommodate a flexible conduit which serves as a pilot line. When filled with fluid under pressure, the pilot conduit covers and seals a port between the recess of the tubular body and the transverse passage. An open slot is provided in the outer side of the head to facilitate installation of the pilot conduit.

5 Claims, 4 Drawing Figures

U.S. Patent  Oct. 24, 1978  4,121,621
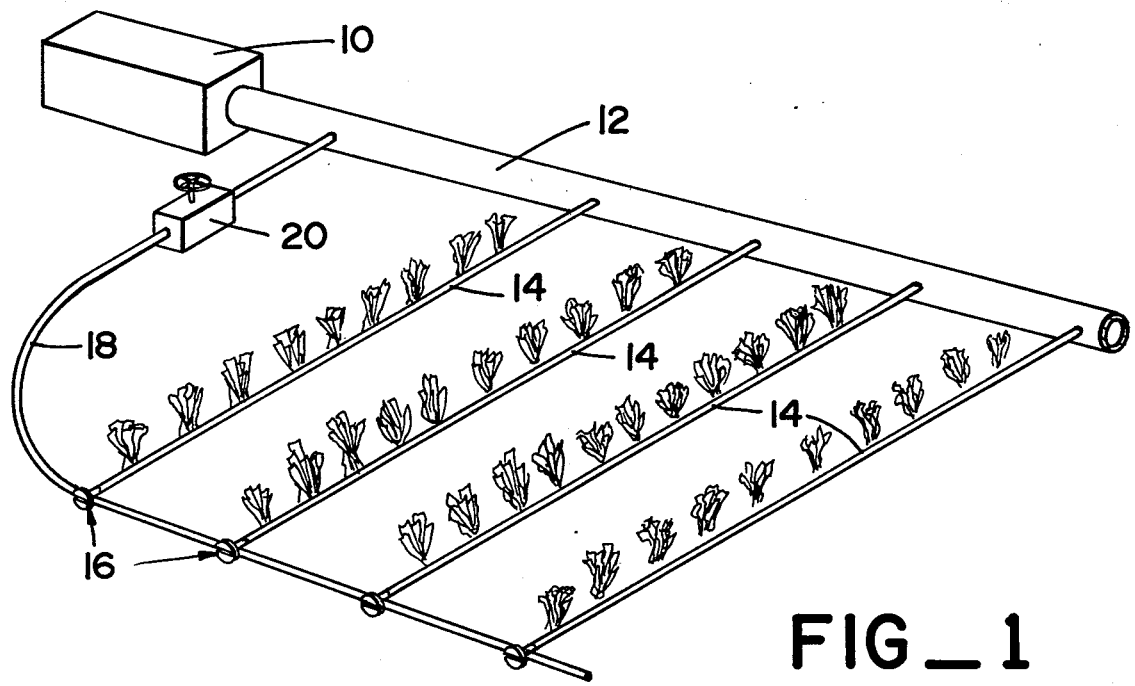
FIG_1
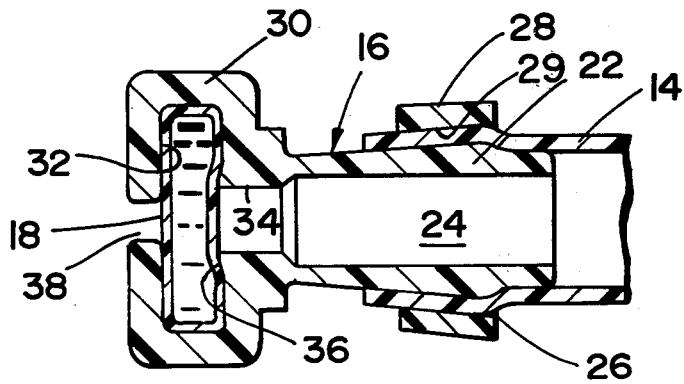
FIG_2
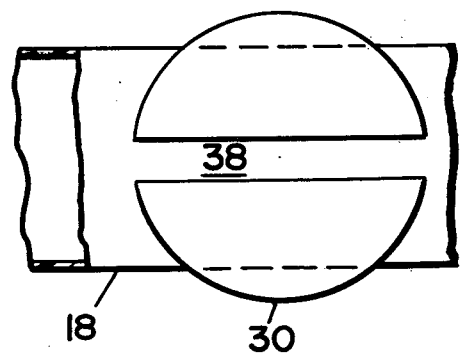
FIG_4
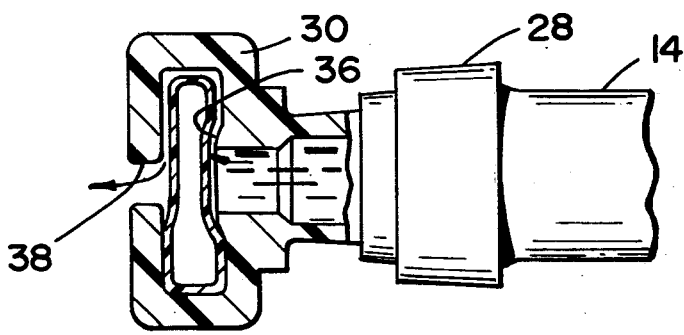
FIG_3

PILOT OPERATED FLUSHING VALVE

This invention relates to controls for fluid distribution system and more particularly it relates to a flushing valve for use in drip type irrigation systems.

BACKGROUND OF THE INVENTION

The use of continuous drip type irrigation systems for certain crops and in particular geographical areas has increased remarkably in recent years because of inherent advantages over other irrigation methods such as sprinkling or furrow irrigation. Perhaps the most important advantage of drip irrigation is that it inherently provides for the most efficient use of available water. However, in addition, it also provides a better way to supply moisture and nutrients to many different crops and results in greater production or yield than the other irrigation techniques.

In a typical drip irrigation installation a main-distribution line connected to a supply of water is attached to a series of branch conduits or laterals that may be spaced apart to extend along rows of plants. Small openings are provided at spaced intervals along each lateral or drip emitters are connected thereto at similar intervals to allow a constant but small flow of water to trickle out of these locations near plants. Due to the inherent buildup of dirt and other deleterious material that inevitably builds up in each lateral (despite filtering of the water from the supply source) the openings or emitters in the laterals tend to get clogged up. Thus, it is necessary to flush out these lateral conduits periodically by allowing water to flow through them at a relatively high velocity for a relatively short period of time. This flushing action has the effect of scrubbing away material that may tend to block the openings in the lateral. Heretofore, it has been the practice to provide a flushing valve at the remote end of each lateral conduit which is controlled by a pilot line connected to the main distribution line. This enables all laterals to be flushed simultaneously and one attempt to provide such an arrangement is shown in U.S. Pat. No. 3,921,905. However, in this patent the flushing valve disclosed is comprised of a cylinder that retains a piston-like valve that is movable to a sealing position in response to pressure from the pilot line. The valve moves in the opposite direction to an open position to allow the flushing action to take place when pilot line pressure is reduced. In field use a major problem with this flushing valve can occur because the accumulation of dirt and slime or chemicals in the water over a period of time may eventually prevent the small piston or valve element from moving as intended within its cylinder. Thus, during a flushing cycle, not all of the flushing valves could be relied on to operate properly and the system would fail to produce the desired results.

One object of the present invention is to solve the aforesaid problem by providing an improved pilot operated flushing valve for use in drip irrigation systems.

Another object of the present invention is to provide a flushing valve for drip irrigation systems that has no moving parts and is capable of reliable operation over relatively long periods of time without replacement or maintenance.

Yet another object of the present invention is to provide a flushing valve for drip irrigation systems that is relatively easy to install and facilitates the convenient installation of a controlling pilot line.

Another object of the present invention is to provide a flushing valve for drip irrigation systems that will operate to maintain a seal on the end of a lateral conduit even if the pilot line pressure drops to well below that of the lateral line pressure.

Still another object of the present invention is to provide a flushing valve for drip irrigation systems that is particularly well adapted for ease and economy of manufacture.

BRIEF SUMMARY OF THE INVENTION

The aforesaid and other objects are achieved by a flushing valve which, according to the present invention, comprises a generally tubular body that is integral with an enlarged head portion. The body has a tapered exterior shape which is sized to fit within the end of a lateral conduit of the drip irrigation system and which cooperates with a locking ring to retain the valve on the conduit. A recess within the body is open at one end to the lateral conduit. Extending through the enlarged head portion is a transverse passage whose openings are on opposite sides thereof, its axis being essentially perpendicular to the longitudinal axis of the valve. A small port provides communication between the body recess of the valve and its transverse passage. Extending from the outer surface of the enlarged valve head and its internal transverse passage is a narrower transverse slot for enabling the installation of the pilot line. The latter is a flexible conduit preferably formed of a thin walled flexible plastic material and when installed it generally fills the entire space of the transverse passage. In a typical drip irrigation system, one end of the pilot line is attached to the main water distribution line and it passes through the transverse passage of each flushing valve in a series of laterals. When the pilot line is filled with fluid under pressure it bears against the port in each flushing valve and prevents any leakage therefrom. On occasions, when flushing of the laterals is required, the pilot line pressure is reduced and water from the laterals is then allowed to flow rapidly through the port of each flushing valve, thereby cleaning out the laterals.

Other objects, advantages and features of my invention will become apparent from the following detailed description presented in conjunction with the accompanying drawing:

BRIEF DESCRIPTION OF THE DRAWING

FIG. 1 is a somewhat schematic view in perspective of a drip irrigation system comprised of a main distribution line with attached lateral conduits, with each conduit having a flushing valve according to the principles of the present invention;

FIG. 2 is an enlarged view in section showing a flushing valve according to the present invention when it is being closed by the pilot line;

FIG. 3 is a view similar to FIG. 2 showing the flushing valve in the open position; and FIG. 4 is a top view of the flushing valve shown in FIGS. 2 and 3.

DETAILED DESCRIPTION OF EMBODIMENT

With reference to the drawing, FIG. 1 shows somewhat schematically a typical drip irrigation system wherein water is supplied from a suitable source through a pump and/or filter 10 to a main distribution line 12 from which extends series of smaller branch lines or laterals 14. These laterals often comprise conduits formed from flexible thin-walled plastic material having a main flow passage and an adjacent auxiliary passage separated by an internal wall, the latter having a series of spaced apart openings through which water can trickle. At the end of each lateral conduit 14 is a flushing valve 16 according to the present invention and extending through each valve is a pilot line 18. This pilot line is connected to any suitable fluid pressure source which may conveniently be the main distribution line 12. Generally, it is also a relatively thin walled plastic conduit but it has but one central fluid passage. A controllable 3 way valve 20 is provided in the pilot line so that the latter can be supplied with fluid pressure when desired to keep all flushing valves closed. When the valve 20 is closed to prevent pressure from reaching along the pilot line, the pilot line pressure is dumped or exhausted, and each flushing valve assumes its open state, thereby allowing water to flow rapidly through and from the end of each lateral conduit. This rapid flow has the effect of removing accumulated dirt, slime and other deleterious material from the laterals and it also provides a scrubbing action which tends to reopen any clogged side openings in the laterals.

As shown in greater detail in FIGS. 2-4, each flushing valve 16 comprises a tubular body or barb portion 22 that is open at one end to form an elongated cylindrical recess 24. The outer surface of the body portion is tapered slightly to a somewhat larger diameter near its relatively short outer end portion which is not tapered. Thus, near the outer end of the body portion is an anular shoulder 26. The valve body portion is readily attached to the open end of a lateral conduit 14 by insertion of its outer end portion therein. The conduit is forced over the body shoulder and up along the tapered body portion. A locking ring 28 is provided in combination with the tapered body to secure it to the lateral conduit. Thus, the locking ring 28 has an inside surface 29 that is tapered to a similar degree as the tapered outer surface of the valve body portion and is only slightly larger in diameter than the largest end of the tapered body portion. When the end of a lateral conduit 14 is positioned on the valve body portion and is pushed over the body shoulder 26, the locking ring can be moved toward the end of the body portion to grip and secure the wall of the lateral. When the well known dual passage lateral conduit is used, the locking ring may be provided with a notch (not shown) to accommodate the bulged out outer chamber on one side of the conduit.

Integral with body portion of each flushing valve is a head portion 30 that is generally cylindrical and has a greater diameter than the body portion. Extending diametrally through this head portion is a transverse passage 32 that is generally rectangular in shape. Communication between the passage 32 and the body recess 24 is provided by a port 34. Surrounding the opening of the port within the passage is an integral ring portion that extends slightly above the surrounding surface and forms an annular sealing seat 36 for a flexible pilot line extending through the transverse passage 32.

On the outer side of the valve head portion, as shown in FIG. 4, is an open slot 38 that communicates with the transverse passage and affords a simple means for inserting the flexible pilot line therein. This slot can be aligned directly with the transverse slot or it can be skewed therewith slightly, if desired.

The flushing valve 16, as described, can be readily produced in high volume production using conventional injection molding techniques with a suitable plastic material that is strong and durable, such as poly vinyl chloride (PVC). As indicated, the design of valve should be made with the usual rounded edges and fillets for maximum strength.

When first installed in a drip irrigation system as shown in FIG. 1, a flushing valve is inserted into each lateral and secured thereto by its locking ring. The flexible pilot line is then placed through the slot 38 and into the transverse passage 32 of each flushing valve. The valve 20 is now opened to allow the pilot line to fill up and retain fluid pressure. As shown in FIG. 2, this causes the pilot line in each flushing valve to bear against the annular seat 36 and to seal the port 34, thereby preventing any escape of fluid from the lateral. When flushing of the laterals is required, the control valve 20 is closed, the pilot line pressure is exhausted and the flexible pilot line within the transverse passage of each flushing valve collapses as shown in FIG. 3. This allows the water under pressure within each lateral to force itself through the port 34 of the flushing valve and out the transverse passage. The relatively rapid flow of water for a short amount of time causes the required flushing or purging of the laterals, as previously described.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A pilot operated flushing valve for installation on the end of a branch fluid conduit of a drip irrigation system, comprising:

a tubular body portion having one end including means for connection onto the end of a branch fluid conduit;

an enlarged head portion extending from the other end of the tubular body portion, having a passage therethrough transverse to the tubular body portion, with a port connecting the transverse passage with the interior of the tubular body portion; and a flexible, pressure-expandable pilot line conduit extending into and passing longitudinally through the transverse passge, transverse and adjacent to the port, and adapted for connection to a remote, regulable source of pilot pressure;

whereby the flexible pilot line may be pressurized from said remote source to expand it against the port to seal off the port and maintain the flushing valve closed, and may be selectively relaxed from said remote source to release pressure on the port and permit flushing of the branch fluid conduit through the port.

2. The flushing valve as described in claim 1 wherein said body portion comprises a tapered outer surface terminating at a shoulder spaced from the outer end of said body portion, and an annular ring member around said body portion having a similarly tapered inner surface only slightly larger in diameter than said shoulder for securing said body portion to a said branch conduit.

3. The flushing valve as described in claim 1 wherein said transverse passage includes generally planar wall means opposite said port for supporting the flexble pilot line when it is expanded against the port.

4. A drip irrigation system including a plurality of branch fluid conduits, a source of pressurized irrigation fluid feeding the branch fluid conduits, a flushing valve as described in claim 1 at the end of each branch fluid conduit, said flexible, pressure-expandable pilot line conduit extending through the transverse passage of each flushing valve, and means connected to said source of pressurized irrigation fluid for selectively pressurizing and relaxing said pilot line conduit, serving as said regulable source of pilot pressure.

5. A flushing valve for installation on the end of a branch fluid conduit of a drip irrigation system, comprising:
   a tubular body portion having one end adapted to connect onto the end of a branch fluid conduit;
   an enlarged head portion extending from the other end of the tubular body portion, having a transverse passage therethrough and a port connecting the transverse passage with the interior of the tubular body portion; and
   a flexible, pressure-expandable pilot line conduit extending through the transverse passage, adjacent to the port, and adapted for connection to a remote, regulable source of pilot pressure;
   said transverse passage including wall means opposite the port for supporting the flexible pilot line when it is expanded against the port, with a slot through the wall means, communicating with and narrower than the transverse passage, providing an opening for insertion of the flexible pilot line conduit laterally into the transverse passage;
   whereby the flexible pilot line may be pressurized from said remote source to expand it against the port to seal off the port and maintain the flushing valve closed, and may be selectively relaxes from said remote source to release pressure on the port and permit flushing of the branch fluid conduit through the port.

* * * * *